(12) United States Patent
Angell et al.

(10) Patent No.: US 8,195,499 B2
(45) Date of Patent: Jun. 5, 2012

(54) IDENTIFYING CUSTOMER BEHAVIORAL TYPES FROM A CONTINUOUS VIDEO STREAM FOR USE IN OPTIMIZING LOSS LEADER MERCHANDIZING

(75) Inventors: Robert Lee Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 11/861,975

(22) Filed: Sep. 26, 2007

(65) Prior Publication Data
US 2009/0083122 A1  Mar. 26, 2009

(51) Int. Cl.
*G06Q 10/00* (2012.01)
(52) U.S. Cl. ...................... 705/7.29; 705/7.12
(58) Field of Classification Search ............... 705/7.11, 705/7.12
See application file for complete search history.

(56) References Cited

U.S. PATENT DOCUMENTS

| | | | |
|---|---|---|---|
| 5,091,780 A | 2/1992 | Pomerleau | |
| 5,729,697 A | 3/1998 | Schkolnick et al. | |
| 5,898,475 A | 4/1999 | Martin | |
| 6,028,626 A | 2/2000 | Aviv | |
| 6,101,486 A | 8/2000 | Roberts et al. | |
| 6,191,692 B1 | 2/2001 | Stoltz et al. | |
| 6,266,649 B1 | 7/2001 | Linden et al. | |
| 6,400,276 B1 | 6/2002 | Clark | |
| 6,976,000 B1 | 12/2005 | Manganaris et al. | |
| 7,092,959 B2 * | 8/2006 | Chen et al. ................ 1/1 |
| 7,118,476 B1 * | 10/2006 | White et al. ............... 463/17 |
| 7,370,004 B1 | 5/2008 | Patel et al. | |
| 7,630,986 B1 | 12/2009 | Herz et al. | |
| 7,813,952 B2 * | 10/2010 | Eskandari ............... 705/7.31 |
| 2002/0111852 A1 | 8/2002 | Levine | |
| 2002/0143613 A1 | 10/2002 | Hong et al. | |
| 2002/0161651 A1 | 10/2002 | Godsey et al. | |
| 2002/0171736 A1 | 11/2002 | Gutta et al. | |
| 2002/0178013 A1 | 11/2002 | Hoffman et al. | |
| 2003/0217024 A1 | 11/2003 | Kocher | |
| 2004/0111454 A1 | 6/2004 | Sorensen | |
| 2004/0125125 A1 | 7/2004 | Levy | |
| 2004/0143505 A1 | 7/2004 | Kovach | |
| 2004/0225627 A1 | 11/2004 | Botros et al. | |
| 2005/0002561 A1 | 1/2005 | Monachino et al. | |

(Continued)

OTHER PUBLICATIONS

Jill Dyche, "The CRM Handbook: A Business Guide to Customer Relationship Management", Aug. 2001, Addison-Wesley Professional, 26-37.*

(Continued)

*Primary Examiner* — Beth V Boswell
*Assistant Examiner* — William Porter
(74) *Attorney, Agent, or Firm* — Yee & Associates, P.C.; John R. Pivnichny

(57) ABSTRACT

A computer implemented method, apparatus, and computer usable program product for optimizing loss leader merchandizing. The process parses event data to identify physical patterns of customer behavior, wherein the event data is derived from a continuous video stream captured at a retail facility, and associates the physical patterns of customer behavior with customer profile data to form dynamic customer profiles. The process then analyzes the dynamic customer profiles to identify types of customers and presents marketing incentives for a set of loss leader items to customers of a selected customer type, wherein the set of loss leader items are selected based on the dynamic profiles.

20 Claims, 5 Drawing Sheets

U.S. PATENT DOCUMENTS

| | | | |
|---|---|---|---|
| 2005/0187819 A1 | 8/2005 | Johnson | |
| 2006/0032915 A1 | 2/2006 | Schwartz | |
| 2006/0074769 A1 | 4/2006 | Looney et al. | |
| 2006/0089918 A1 | 4/2006 | Avanzi et al. | |
| 2006/0116927 A1 | 6/2006 | Miller, III et al. | |
| 2006/0184410 A1* | 8/2006 | Ramamurthy et al. | 705/8 |
| 2006/0200378 A1 | 9/2006 | Sorensen | |
| 2006/0218057 A1 | 9/2006 | Fitzpatrick et al. | |
| 2006/0251541 A1 | 11/2006 | Santandrea | |
| 2007/0008408 A1 | 1/2007 | Zehavi | |
| 2007/0052536 A1 | 3/2007 | Hawkes et al. | |
| 2007/0069014 A1 | 3/2007 | Heckel et al. | |
| 2007/0078759 A1 | 4/2007 | Lilly et al. | |
| 2007/0100649 A1 | 5/2007 | Walker et al. | |
| 2007/0112713 A1 | 5/2007 | Seaman et al. | |
| 2007/0244778 A1 | 10/2007 | Bailard | |
| 2007/0291118 A1 | 12/2007 | Shu et al. | |
| 2007/0294706 A1 | 12/2007 | Neuhauser et al. | |
| 2008/0004951 A1 | 1/2008 | Huang et al. | |
| 2008/0033752 A1 | 2/2008 | Rodgers | |
| 2008/0059282 A1 | 3/2008 | Vallier et al. | |
| 2008/0059297 A1 | 3/2008 | Vallier et al. | |
| 2008/0077493 A1 | 3/2008 | Geffert | |
| 2008/0114633 A1 | 5/2008 | Wolf et al. | |
| 2008/0147511 A1 | 6/2008 | Edwards | |
| 2008/0215391 A1 | 9/2008 | Dowling et al. | |
| 2008/0243626 A1 | 10/2008 | Stawar et al. | |
| 2008/0270172 A1 | 10/2008 | Luff et al. | |
| 2008/0270220 A1 | 10/2008 | Ramer et al. | |
| 2008/0270222 A1 | 10/2008 | Goel | |
| 2009/0037193 A1 | 2/2009 | Vempati et al. | |
| 2009/0198625 A1 | 8/2009 | Walker et al. | |
| 2010/0023372 A1 | 1/2010 | Gonzalez | |
| 2010/0032482 A1 | 2/2010 | Clark et al. | |
| 2010/0169229 A1 | 7/2010 | Lee | |

OTHER PUBLICATIONS

U.S. Appl. No. 11/695,983, filed Apr. 3, 2007, Angell et al.
U.S. Appl. No. 11/861,520, filed Sep. 26, 2007, Angell et al.
U.S. Appl. No. 11/861,590, filed Sep. 26, 2007, Angell et al.
U.S. Appl. No. 11/861,729, filed Sep. 26, 2007, Angell et al.
U.S. Appl. No. 11/862,279, filed Sep. 27, 2007, Angell et al.
U.S. Appl. No. 11/862,294, filed Sep. 27, 2007, Angell et al.
U.S. Appl. No. 11/862,299, filed Sep. 27, 2007, Angell et al.
U.S. Appl. No. 11/862,306, filed Sep. 27, 2007, Angell et al.
U.S. Appl. No. 11/862,320, filed Sep. 27, 2007, Angell et al.
U.S. Appl. No. 11/862,323, filed Sep. 27, 2007, Angell et al.
U.S. Appl. No. 11/743,982, filed May 3, 2007, Angell et al.
U.S. Appl. No. 11/744,024, filed May 3, 2007, Angell et al.
U.S. Appl. No. 11/769,409, filed Jun. 27, 2007, Angell et al.
U.S. Appl. No. 11/756,198, filed May 31, 2007, Angell et al.
U.S. Appl. No. 11/771,252, filed Jun. 29, 2007, Angell et al.
U.S. Appl. No. 11/764,524, filed Jun. 18, 2007, Angell et al.
U.S. Appl. No. 11/861,528, filed Sep. 26, 2007, Angell et al.
U.S. Appl. No. 11/862,374, filed Sep. 27, 2007, Angell et al.
U.S. Appl. No. 11/771,887, filed Jun. 29, 2007, Angell et al.
U.S. Appl. No. 11/771,912, filed Jun. 29, 2007, Angell et al.
U.S. Appl. No. 11/861,966, filed Sep. 26, 2007, Angell et al.
USPTO office action for U.S. Appl. No. 11/695,983 dated Mar. 25, 2010.
USPTO office action for U.S. Appl. No. 11/861,520 dated May 6, 2010.
USPTO office action for U.S. Appl. No. 11/743,982 dated Mar. 24, 2010.
USPTO office action for U.S. Appl. No. 11/769,409 dated Apr. 14, 2010.
USPTO office action for U.S. Appl. No. 11/756,198 dated Apr. 22, 2010.
USPTO office action for U.S. Appl. No. 11/771,252 dated May 5, 2010.
USPTO office action for U.S. Appl. No. 11/764,524 dated Apr. 15, 2010.
USPTO office action for U.S. Appl. No. 11/861,528 dated May 13, 2010.
USPTO office action for U.S. Appl. No. 11/771,887 dated Mar. 8, 2010.
USPTO office action for U.S. Appl. No. 11/771,912 dated Apr. 8, 2010.
Wu et al. "Vehicle Sound Signature Recognition by Frequency Vector Principal Component Analysis", IEEE Instrumentation and Measurement Technology Conference, May 18-20, 1998, pp. 429-434.
Kosba, et al, "Personalized Hypermedia Presentation Techniques for Improving Online Customer Relationships", The Knowledge Engineering Review, Vo 16:2, 2001, pp. 111-155.
Ng, Cheuk-Fan, Satisfying shoppers psychological needs: From public market to cyber-mall, 2002, Journal of Environmental Psycology, 23 (2003) pp. 439-455.
USPTO office action for U.S. Appl. No. 11/861,590 dated Jun. 15, 2010.
USPTO office action for U.S. Appl. No. 11/861,729 dated Jun. 15, 2010.
USPTO office action for U.S. Appl. No. 11/862,306 dated Jun. 24, 2010.
USPTO office action for U.S. Appl. No. 11/862,320 dated Aug. 5, 2010.
USPTO office action for U.S. Appl. No. 11/743,982 dated Aug. 19, 2010.
USPTO final office action for U.S. Appl. No. 11/756,198 dated Aug. 31, 2010.
USPTO office action for U.S. Appl. No. 11/862,374 dated Aug. 19, 2010.
USPTO final office action for U.S. Appl. No. 11/769,409 dated Aug. 31, 2010.
USPTO final office action for U.S. Appl. No. 11/771,912 dated Jul. 21, 2010.
USPTO final office action for U.S. Appl. No. 11/861,528 dated Sep. 9, 2010.
USPTO Notice of allowance for U.S. Appl. No. 11/771,887 dated Sep. 2, 2010.
Knuchel et al., "A Learning based approach for anonymous Recommendation", Proceedings of the 8th IEEE International Conference on E-Commerce Technology and the 3rd IEEE International Conference on Enterprise Computing, E-Commerce and E-Services, 2006, pp. 1-8.
USPTO Office Action dated Jul. 19, 2011 for U.S. Appl. No. 11/863,279.

* cited by examiner

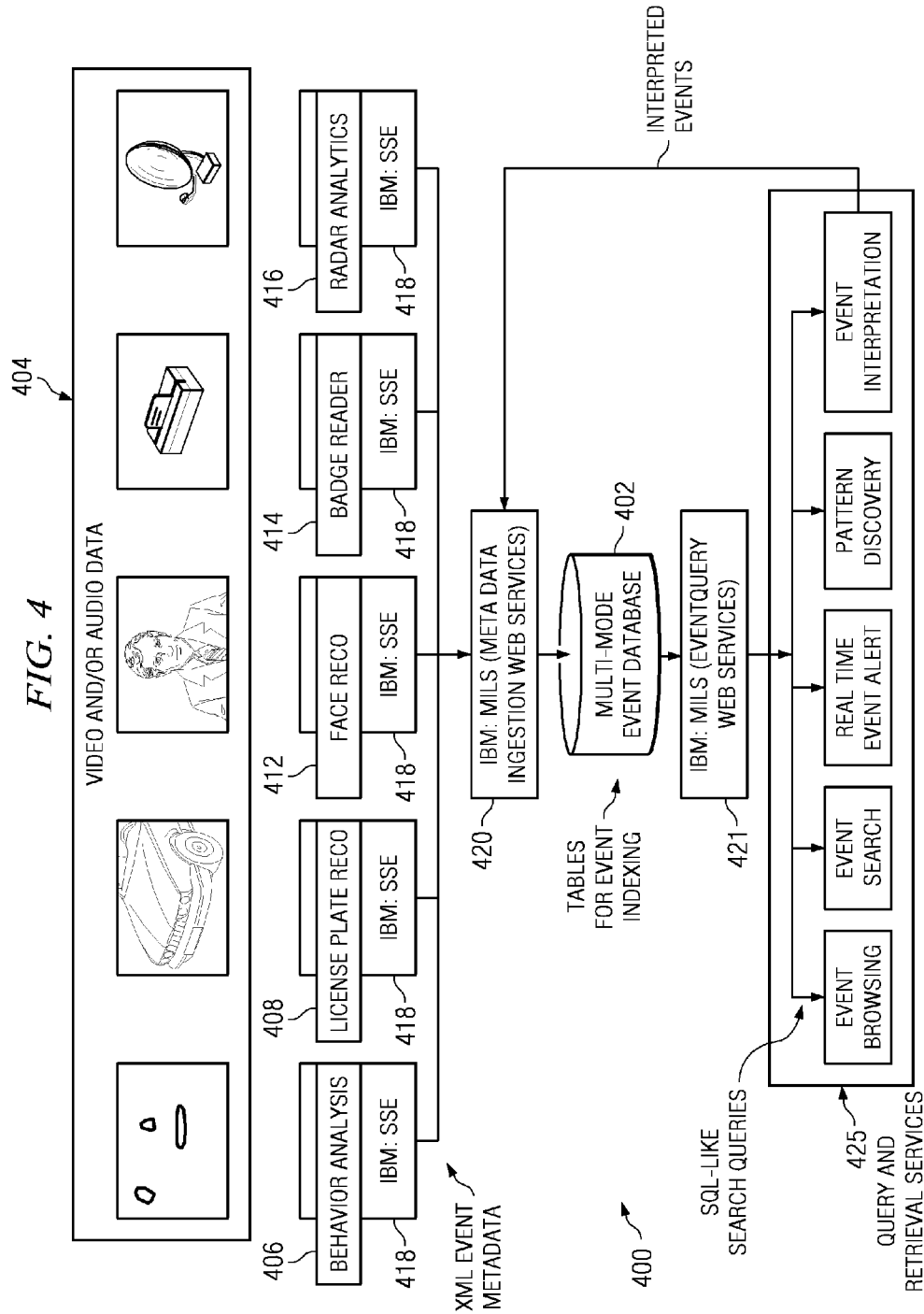

IDENTIFYING CUSTOMER BEHAVIORAL TYPES FROM A CONTINUOUS VIDEO STREAM FOR USE IN OPTIMIZING LOSS LEADER MERCHANDIZING

CROSS-REFERENCE TO RELATED APPLICATIONS

The present invention is related to the application entitled Intelligent Surveillance System and Method for Integrated Event Based Surveillance, application Ser. No. 11/455,251 (filed Jun. 16, 2006), assigned to a common assignee, and which is incorporated herein by reference.

BACKGROUND OF THE INVENTION

1. Field of the Invention

The present invention is related generally to an improved data processing system and in particular to a method and apparatus for processing video and audio data. More particularly, the present invention is directed to a computer implemented method, apparatus, and computer usable program product to identify customer behavioral types for optimizing loss leader merchandizing from a continuous video stream.

2. Description of the Related Art

Customers have a wide selection of stores from which to purchase retail items. Retail items are items offered for sale and include, for example, clothes, food, groceries, furniture, automotive supplies, or any other tangible thing that may be purchased. Retail items may also include retail services, such as dry cleaning services, food delivery services, automobile repair services, vehicle detailing services, or any other services. The stores from which shoppers may purchase these retail items or services may be traditional brick and mortar stores or an online store accessible only through a webpage. The traditional brick and mortar stores compete for customers' business, often investing large sums of money to devise ways to entice customers to visit. One commonly used method for increasing customer traffic is by offering loss leader items for sale.

A loss leader item is a retail item that may be given away or sold at or below cost in an effort to attract customers to a store with hopes that those customers will purchase complementary items. Complementary items are retail items that are offered to a customer for purchase after the customer has been drawn to the store by the loss leader item. Oftentimes, the complementary item is related to the loss leader item. A loss leader item may be, for example, a razor. The use of the razor may require the purchase of complementary items, such as, razor cartridges, shaving cream and/or aftershave. Other examples of loss leader items include, without limitation, gasoline, inkjet printers, video game consoles, food items on fast food value menus, and movie tickets.

Offering loss leader items to the public may be a risky endeavor. If not carefully planned out, the sale of loss leader items by a store may result in substantial financial losses. For example, a gas station may lose money on the sale of competitively priced gasoline, but may make enough profit on the sale of complementary items, which are, in this example, convenience store items that offset the losses attributed to the sale of gasoline. If, however, gas station customers only purchase gasoline, then the gas station may suffer financial losses. Consequently, loss leader merchandizing is an important aspect of offering loss leader items to customers.

Loss leader merchandising is a scheme or strategy for increasing customer traffic to a store and for influencing customers to purchase as many complementary items as possible. The marketing strategy may include, for example, identifying loss leader items and associated complementary items, disbursement of advertisements, placement of loss leader items and complementary items in a store, the location of a shelf of kiosk, the use of special events for promoting the sale of retail items, or location of point of purchase displays. Currently, loss leader merchandising is developed from data collected from transactional or static data elements, such as, point of sale data, surveys, or census data. This method, however, does not provide insight as to whether loss leader merchandising is effective. For example, if a customer purchases loss leader items and complementary items, point of sale data provides no indication as to whether the loss leader merchandising contributed to the purchases.

SUMMARY OF THE INVENTION

The illustrative embodiments provide a computer implemented method, apparatus, and computer usable program product optimizing loss leader merchandizing. The process parses event data to identify physical patterns of customer behavior, wherein the event data is derived from a continuous video stream captured at a retail facility, and associates the physical patterns of customer behavior with customer profile data to form dynamic customer profiles. The process then analyzes the dynamic customer profiles to identify types of customers and presents marketing incentives for a set of loss leader items to customers of a selected customer type, wherein the set of loss leader items are selected based on the dynamic profiles.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram of a smart detection system in accordance with an illustrative embodiment of the present invention;

DETAILED DESCRIPTION OF THE PREFERRED EMBODIMENT

Figure 1:
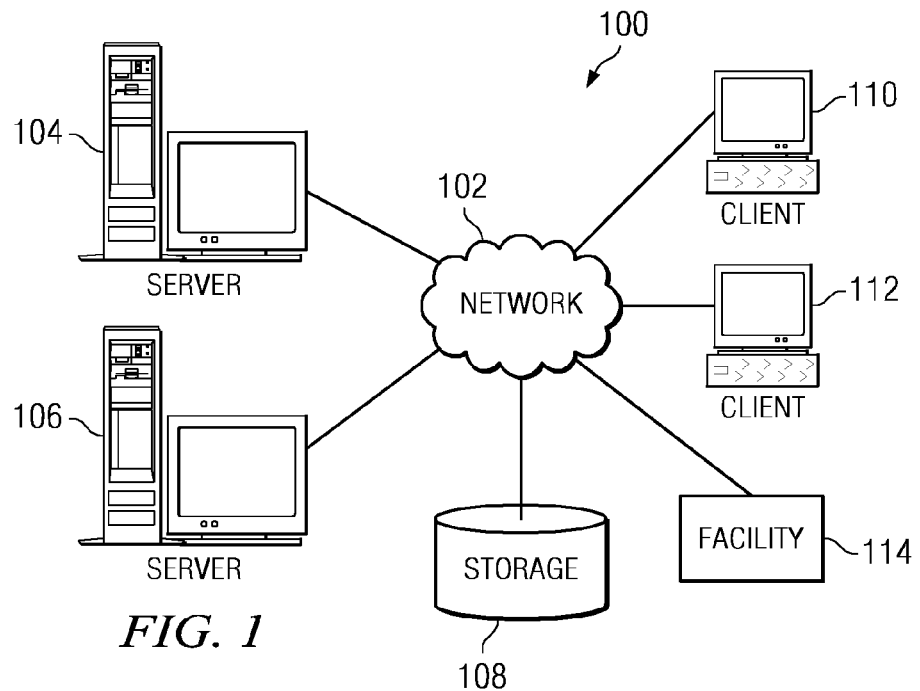
FIG. 1 is a pictorial representation of a network of data processing systems in which illustrative embodiments may be implemented.
Figure 3:
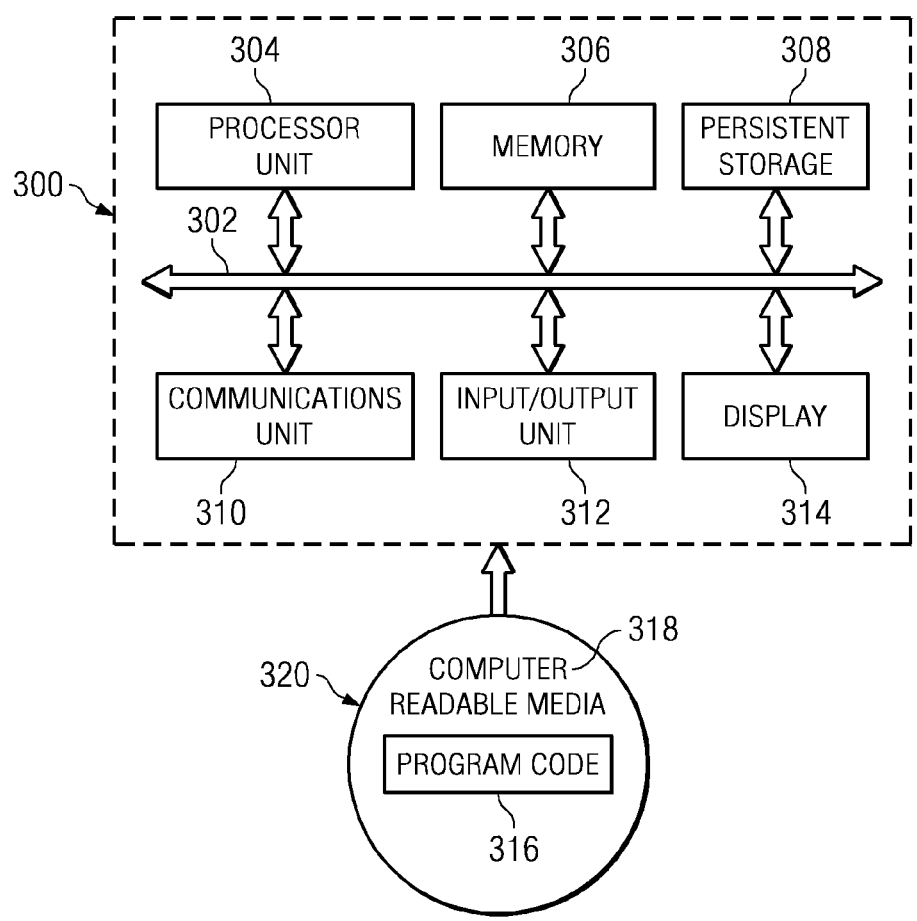
FIG. 3 is a block diagram of a data processing system in which illustrative embodiments may be implemented.
Figure 2:
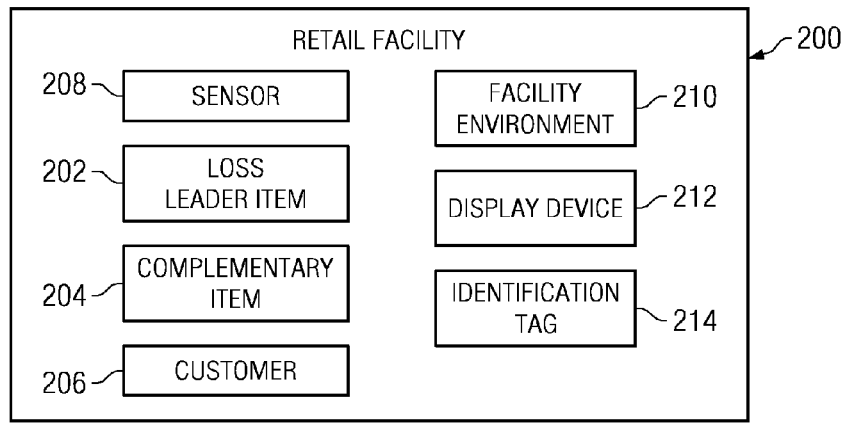
FIG. 2 is a block diagram of a retail facility in which illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage area network (SAN) 108. Storage area network 108 is a network connecting one or more data storage devices to one or more servers, such as servers 104 and 106. A data storage device, may include, but is not limited to, tape libraries, disk array controllers, tape drives, flash memory, a hard disk, and/or any other type of storage device for storing data. Storage area network 108 allows a computing device, such as client 110 to connect to a remote data storage device over a network for block level input/output.

In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Facility 114 also connects to network 102. In addition to connecting to clients 110 and 112 and servers 104 and 106 through network 102, facility 114 may also include one or more local computing devices, such as client 110 or server 104 located within facility 114.

Facility 114 may be a retail facility in which customers may view, select order, and/or purchase one or more retail items. Facility 114 may include one or more facilities, buildings, or other structures for wholly or partially containing retail items. Exemplary retail facilities may include, without limitation, a grocery store, a clothing store, an indoor mall, an outdoor mall, a marketplace, a retail department store, a convention center, farmer's market, a sports arena or stadium, an airport, a bus depot, a train station, a marina, a hotel, fair grounds, a superstore, or any other type of facility for housing, storing, displaying, and/or selling retail items.

Retail items in facility 114 may include, but are not limited to, comestibles, clothing, shoes, toys, cleaning products, household items, machines, any type of manufactured items, entertainment and/or educational materials, as well as entrance or admittance to attend or receive an educational or entertainment service, activity, or event.

Comestibles include solid, liquid, and/or semi-solid food and beverage items. Comestibles may be, but are not limited to, meat products, dairy products, fruits, vegetables, bread, pasta, pre-prepared or ready-to-eat items, as well as unprepared or uncooked food and/or beverage items. For example, a comestible could include, without limitation, a box of cereal, a steak, tea bags, a cup of tea that is ready to drink, popcorn, pizza, candy, or any other edible food or beverage items.

An entertainment or educational activity, event, or service may include, but is not limited to, a sporting event, a music concert, a seminar, a convention, a movie, a ride, a game, a theatrical performance, and/or any other performance, show, or spectacle for entertainment or education of customers. For example, entertainment or educational activity or event could include, without limitation, the purchase of seating at a football game, the purchase of a ride on a roller coaster, the purchase of a manicure, or the purchase of admission to view a film.

Facility 114 may also include a parking facility for parking cars, trucks, motorcycles, bicycles, or other vehicles for conveying customers to and from facility 114. A parking facility may include an open air parking lot, an underground parking garage, an above ground parking garage, an automated parking garage, and/or any other area designated for parking customers' vehicles.

For example, facility 114 may be, but is not limited to, a grocery store, a retail store, a department store, an indoor mall, an outdoor mall, a combination of indoor and outdoor retail areas, a farmer's market, a convention center, a sports arena or stadium, an airport, a bus depot, a train station, a marina, a hotel, fair grounds, an amusement park, a water park, and/or a zoo.

Facility 114 encompasses a range or area in which marketing messages may be transmitted to a digital display device for presentation to a customer within facility 114. Digital multimedia management software is used to manage and/or enable generation, management, transmission, and/or display of marketing messages within a retail facility. Examples of digital multimedia management software includes, but is not limited to, Scala® digital media/digital signage software, EK3® digital media/digital signage software, and/or Allure digital media software.

Display devices may be located within facility 114 in accordance with a marketing strategy or marketing model to increase the likelihood that a customer will view the marketing messages being displayed on a particular display device and/or increase the likelihood a customer will purchase an item. A marketing strategy is a plan including one or more ideas or principles directed to, for example, increasing the revenues of a retail facility by promoting sales of loss leader items and/or complementary items. In other words, a marketing strategy is a plan that, when implemented, improves or increases profits of a store. A marketing model may include one or more marketing strategies.

Facility 114 includes shelves, displays, racks, cases, refrigeration units, freezer units, hot boxes, and other containers for storing items. Items may be displayed on shelves, displays, racks, cases, refrigeration units, freezer units, hot boxes, and other containers as part of a marketing strategy for optimizing loss leader merchandizing. For example, complementary items may be placed in the vicinity of loss leader items to increase the likelihood that customers will purchase the complementary items.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, without limitation, an intranet, an Ethernet, a local area network (LAN), and/or a wide area network (WAN).

FIG. 1 is intended as an example, and not as an architectural limitation for different embodiments. Network data processing system 100 may include additional servers, clients, data storage devices, and/or other devices not shown. For example, server 104 may also include devices not depicted in FIG. 1, such as, without limitation, a local data storage device. A local data storage device could include a hard disk, a flash memory, a non-volatile random access memory (NVRAM), a read only memory (ROM), and/or any other type of device for storing data.

FIG. 2 depicts a simplified block diagram of a facility in which illustrative embodiments may be implemented. In this illustrative embodiment in FIG. 2, retail facility 200 is a facility such as facility 114 in FIG. 1. In this illustrative example in FIG. 2, retail facility 200 is configured for promoting the sale of loss leader item 202 and, indirectly, complementary item 204. Loss leader item 202 is one or more retail items selected and priced to entice customer 206 to visit retail facility 200. Customer 206 is one of more customers who visit retail facility 200 for purchasing retail items.

Loss leader item 202 is a retail item that may be given away or sold at or below cost in an effort to attract customer 206 to a store with hopes that customer 206 will purchase complementary item 204. Complementary item 204 is a retail item associated with loss leader item 202. The association of complementary item 204 may be determined by various methods. For example, complementary item 204 may be a component of loss leader item 202 or used with loss leader item 202. Thus, as described above, loss leader item 202 may be a razor and complementary item 204 may be razor cartridges, shaving cream, or aftershave. In many instances, complementary item 204 is selected so that customer 206 purchasing loss leader item 202 also purchases one or more of complementary item 204.

Complementary item 204 may also be a similar type of retail item as loss leader item 202. For example, if retail facility 200 is a car dealership offering a highly discounted base model car as loss leader item 202, then complementary item 204 may be a similar model vehicle having upgrades and options not present in loss leader item 202.

Complementary item 204 may also be associated with loss leader item 202 based upon trends identified from customer profile information. Customer profile information is data that describes the purchasing patterns of customers, such as customer 206. For example, two items that may not have an obvious correlation, such as beer and diapers, may be habitually purchased concurrently by customer 206 for some non-obvious reason.

Retail facility 200 includes one or more strategically placed sensors for gathering detection data at retail facility 200. Detection data is processed to form event data. Event data is data and metadata describing, for example, actions, conditions, and events that occur in a facility, such as facility 200. In particular, the event data describes the physical patterns of customer behavior exhibited at retail facility 200. The physical patterns of customer behavior are tendencies, habits, or repeated behavior exhibited by a customer at retail facility 200. For example, the physical patterns of behavior include, without limitation the frequency that customer 206 reads nutrition information printed on the back of a cereal box before either placing the cereal box in a shopping cart or back on the display rack, the speed at which customer 206 walks though retail facility 200, whether customer 206 brings children to the store, or whether customer 206 opts for a shopping cart or a shopping basket instead. Other examples of physical patterns of customer behavior may include, without limitation, a common path taken by customer 206 to move through a store, whether customer 206 consults a grocery list before putting an item into a shopping cart, the amount of time that customer 206 spends in a particular aisle, or the amount of time that customer 206 will spend looking at retail item displays.

To gather detection data, retail facility 200 includes sensor 208. Sensor 208 is a set of one or more sensors deployed at retail facility 200 for monitoring a location, an object, or a person. Sensor 208 may be located internally and/or externally to facility 200. For example, sensor 208 may be mounted on a wall, a ceiling, equipment, carried by a worker or customer, or placed on any other strategic location within retail facility 200 to document the physical patterns of customer behavior exhibited by customers at retail facility 200.

Sensor 208 may be any type of sensing device for gathering event data associated with the performance of a particular task at retail facility 200. Sensor 208 may include, without limitation, a camera, a motion sensor device, a sonar, a sound recording device, an audio detection device, a voice recognition system, a heat sensor, a seismograph, a pressure sensor, a device for detecting odors, scents, and/or fragrances, a radio frequency identification (RFID) tag reader, a global positioning system (GPS) receiver, and/or any other detection device for detecting the presence of a person or object at retail facility 200.

A heat sensor may be any type of known or available sensor for detecting body heat generated by a human or animal. A heat sensor may also be a sensor for detecting heat generated by a vehicle, such as an automobile or a motorcycle.

A motion detector may include any type of known or available motion detector device. A motion detector device may include, but is not limited to, a motion detector device using a photo-sensor, radar or microwave radio detector, or ultrasonic sound waves.

A motion detector using ultrasonic sound waves transmits or emits ultrasonic sounds waves. The motion detector detects or measures the ultrasonic sound waves that are reflected back to the motion detector. If a human, an animal, or other object moves within the range of the ultrasonic sound waves generated by the motion detector, the motion detector detects a change in the echo of sound waves reflected back. This change in the echo indicates the presence of a human, animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, an animal, or other object moves into the range of the microwave radio energy field generated by the motion detector, the amount of energy reflected back to the motion detector is changed. The motion detector identifies this change in reflected energy as an indication of the presence of the human, the animal, or the other object moving within the motion detectors range.

A motion detector device, using a photo-sensor, detects motion by sending a beam of light across a space into a photo-sensor. The photo-sensor detects when a human, an animal, or object breaks or interrupts the beam of light as the human, the animal, or the object moves in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or a floor mat, the pressure sensor detects a change in weight or mass when a human or an animal steps on the pressure sensor. The pressure sensor may also detect when a human or an animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

A camera may be any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area. A continuous video stream is multimedia captured by a video camera that may be processed to extract event data. The multimedia may be video, audio, or sensor data collected by sensors. In addition, the multimedia may include any combination of video, audio, and sensor data. The continuous video data stream is constantly generated to capture event data about the environment being monitored.

Various lenses, filters, and other optical devices such as zoom lenses, wide angle lenses, mirrors, prisms, and the like may also be used with the image capture device to assist in capturing the desired view. Devices may be fixed in a particular orientation and configuration, or it may, along with any optical device, be programmable in orientation, light sensitivity level, focus, or other parameters. Programming data may be provided via a computing device, such as server 104 in FIG. 1.

A camera may also be a stationary camera and/or a non-stationary camera. A non-stationary camera is a camera that is capable of moving and/or rotating along one or more directions, such as up, down, left, right, and/or rotate about an axis of rotation. The camera may also be capable of moving to follow or track a person, an animal, or an object in motion. In other words, the camera may be capable of moving about an axis of rotation in order to keep a person or object within a viewing range of the camera lens. In this example, sensor 208 includes non-stationary digital video cameras.

Sensor 208 is coupled to, or in communication with, an analysis server on a data processing system, such as network data processing system 100 in FIG. 1. An exemplary analysis server is illustrated and described in greater detail in FIG. 5, below. The analysis server includes software for analyzing digital images and other data captured by sensor 208 to gather event data in retail facility 200.

The audio and video data collected by sensor 208, also referred to as detection data, are sent to smart detection software for processing. The smart detection software processes the detection data to form the event data. The event data includes data and metadata describing events captured by sensor 208. The event data is then sent to the analysis server for additional processing to identify customer types. A customer type, or alternatively, a type of customer, is classification of customers grouped according to similarities, such as, traits, habits, behavior, or tendencies. Customers that customarily purchase frozen meals may be assigned to a customer type. Also, customers may be assigned to a customer type according to physical patterns of customer behavior. Thus, customers who tend to walk briskly, or who check labels on retail items before selecting an item for purchase, or who reference grocery lists before making a selection, may be of different customer types.

Sensor 208 may also be configured to monitor facility environment 210. Facility environment 210 is the ambient conditions of retail facility 200. Thus, facility environment 210 may include, without limitation, temperature, humidity, level of lighting, level of ambient noise, or any other condition of retail facility 200 that may have an effect on the behavior of customer 206.

Retail facility 200 may also include display device 212. Display device 212 is an apparatus for presenting items, information, or images to customer 206. Display device 212 may be, for example, multimedia devices for presenting text, graphics, audio, video, and/or any combination of text, graphics, audio, and video to a customer. For example, display device 212 may be, without limitation, a computer display screen, a laptop computer, a tablet personal computer (PC), a video display screen, a digital message board, a monitor, a kiosk, a personal digital assistant (PDA), and/or a cellular telephone with a display screen. In addition, display device 212 may also include, electronic coupon dispensers, placards displaying prices of retail items, shelving units and refrigerator units configured for presenting retail items, kiosks, store directories, or any other similar type of apparatus.

Retail facility 200 may also include identification tag 214. Identification tag 214 is one or more tags associated with objects or persons in retail facility 200. Thus, identification tag 214 may be utilized to identify an object or person and to determine a location of the object or person. For example, identification tag 214 may be, without limitation, a bar code pattern, such as a universal product code (UPC) or a European article number (EAN), a radio frequency identification (RFID) tag, or other optical identification tag. Identification tag 214 may be affixed to or otherwise associated with retail items, such as loss leader item 202 and complementary item 204. In addition, the identification tag may be a customer loyalty card in the possession of customer 206. The type of identification tag implemented in retail facility 200 depends upon the capabilities of the image capture device and associated data processing system to process the information.

The data processing system, discussed in greater detail in FIG. 3 below, includes associated memory, which may be an integral part, such as the operating memory, of the data processing system or externally accessible memory. Software for tracking objects may reside in the memory and run on the processor. The software in the data processing system maintains a list of all people, sensors, equipment, tools, and any other item of interest in facility 200. The list is stored in a database. The database may be any type of database such as a spreadsheet, a relational database, a hierarchical database or the like. The database may be stored in the operating memory of the data processing system, externally on a secondary data storage device, locally on a recordable medium such as a hard drive, a floppy drive, a CD ROM, a DVD device, remotely on a storage area network, such as storage 108 in FIG. 1, or in any other type of storage device.

The lists are updated frequently enough to provide a dynamic, accurate, real time listing of the people and objects located within retail facility 200, as well as the events that occur within retail facility 200. The listing of people, objects, and events may be usable to trigger definable actions. For example, an inventory system having access to a list of retail items within retail facility 200 may automatically generate a notification to an employee that the number of loss leader items on a display shelf are below a threshold and require restocking.

With reference now to FIG. 3, a block diagram of a data processing system is shown in which illustrative embodiments may be implemented. Data processing system 300 is an example of a computer, such as server 104 or client 110 in FIG. 1, in which computer usable program code or instructions implementing the processes may be located for the illustrative embodiments. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306, in these examples, may be, for example, a random access memory. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as, program code, computer usable program code, or computer readable program code that may be read and executed by a processor in processor unit 304. The program code in the different embodiments may be embodied on different physical or tangible computer readable media, such as memory 306 or persistent storage 208.

Program code 316 is located in a functional form on computer readable media 318 and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive or a flash memory that is connected to data processing system 300. The tangible form of computer readable media 318 is also referred to as computer recordable storage media.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

For example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 202. A processing unit may include one or more processors or CPUs.

The depicted examples in FIGS. 1-3 are not meant to imply architectural limitations. The hardware in FIGS. 1-3 may vary depending on the implementation. For example, data processing system 300 also may be a tablet computer, laptop computer, or telephone device in addition to taking the form of a PDA. In addition, other internal hardware or peripheral devices, such as flash memory, equivalent non-volatile memory, or optical disk drives and the like, may be used in addition to or in place of the hardware depicted in FIGS. 1 and 3. Also, the processes of the illustrative embodiments may be applied to a multiprocessor data processing system.

The use of sensors, particularly digital video cameras, to capture event data describing physical patterns of customer behavior at a retail facility allows optimization of loss leader merchandizing. In particular, analysis of event data describing physical patterns of customer behavior enables identification of customer types. Data relating to the customer types, when combined with traditional customer profile data, such as data derived from point of sale transactions and loyalty card transactions, may be used to optimize loss leader merchandizing. It will be appreciated by one skilled in the art that the words "optimize," "optimization," and other related terms are terms of art that refer to improvements in speed and/or efficiency, and do not purport to indicate that a process has achieved, or is capable of achieving, an "optimal" or perfectly speedy and/or perfectly efficient state.

Loss leader merchandizing may be optimized by implementing a loss leader merchandizing scheme or marketing strategy to satisfy one or more specified criteria or conditions. The criteria or conditions may be, for example, associated with an amount of revenue generated over a period of time, a number of retail items sold in response to delivery of marketing incentives, a number of unique customers that have purchased a loss leader item and/or complementary item, or any other condition or criteria.

Therefore, the aspects of the illustrative embodiments recognize that it is advantageous to optimize loss leader merchandizing to increase revenue and profits at a retail facility. The illustrative embodiments described herein provide a computer implemented method, apparatus, and computer usable program product for optimizing loss leader merchandizing. The process parses event data to identify physical patterns of customer behavior, wherein the event data is derived from a continuous video stream captured at a retail facility, and associates the physical patterns of customer behavior with customer profile data to form dynamic customer profiles. The process then analyzes the dynamic customer profiles to identify types of customers and presents marketing incentives for a set of loss leader items to customers of a selected customer type, wherein the set of loss leader items are selected based on the dynamic profiles.

Event data is processed to identify customer types. Processing, analyzing, or parsing data, including event data, may include, but is not limited to, formatting the event data for utilization and/or analysis in one or more data models, comparing the event data to a data model and/or filtering the event data for relevant data elements to identify customer behavior types.

The event data is analyzed using one or more data models in a set of data models to identify physical patterns of customer behavior. For example, a physical pattern of customer behavior may indicate that on a hot afternoon, customers tend to park on the south side of the retail facility's parking lot, which has more trees and covered parking spots rather than the west side of the parking lot that has greater exposure to the sun. Likewise, the physical patterns of customer behavior may indicate that on hot afternoons, customers tend to slow their pace of walking or pause for a moment in the center of an aisle that is located underneath an air-conditioning vent.

A set of data models includes one or more data models. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a marketing model, a behavioral model, a psychological model, a sociological model, or a simulation model.

The physical patterns of customer behavior may be combined with or otherwise associated with traditional customer profiles to form dynamic customer profiles. Traditional customer profiles are customer profiles generated from the analysis of point of sale data and information derived from customers' use of retail facility loyalty cards. A loyalty card is a card that identifies the holder of the card as a member of a loyalty program that usually offers the member discounted prices on the purchases of selected retail items.

A dynamic customer profile is a customer profile incorporating data describing physical patterns of customer behavior exhibited by a customer at a location, such as a retail facility. Dynamic customer profiles may be analyzed to more accurately identify customer behavior types, which may then be used to predict or infer how customers may react to certain marketing incentives.

A marketing incentive is an incentive or enticement that causes a customer to visit a store and to purchase loss leader item 202 and/or complementary item 204. The marketing incentive may be a coupon, a message painted on the window of a retail facility, a weekly advertisement placed in the Sunday paper, a pop-up advertisement presented in a web browser, a message presented on an electronic display device, a price placard on a display shelf, or any other similar type of incentive that influences a customer to initiate the process of selecting and purchasing retail items, particularly complementary item 204.

Thus, in this depicted example, when a customer, such as customer 206 in FIG. 2 enters a retail facility, the customer is detected and identified by a set of sensors, such as sensor 208 in FIG. 2. The set of sensors collect data, including video data, of the customer to form event data. The customer is tracked throughout the retail facility by the set of sensors configured to capture image data and/or other detection data. In particular, the set of sensors may be configured to capture detection data describing physical patterns of behavior of a customer.

Figure 5:
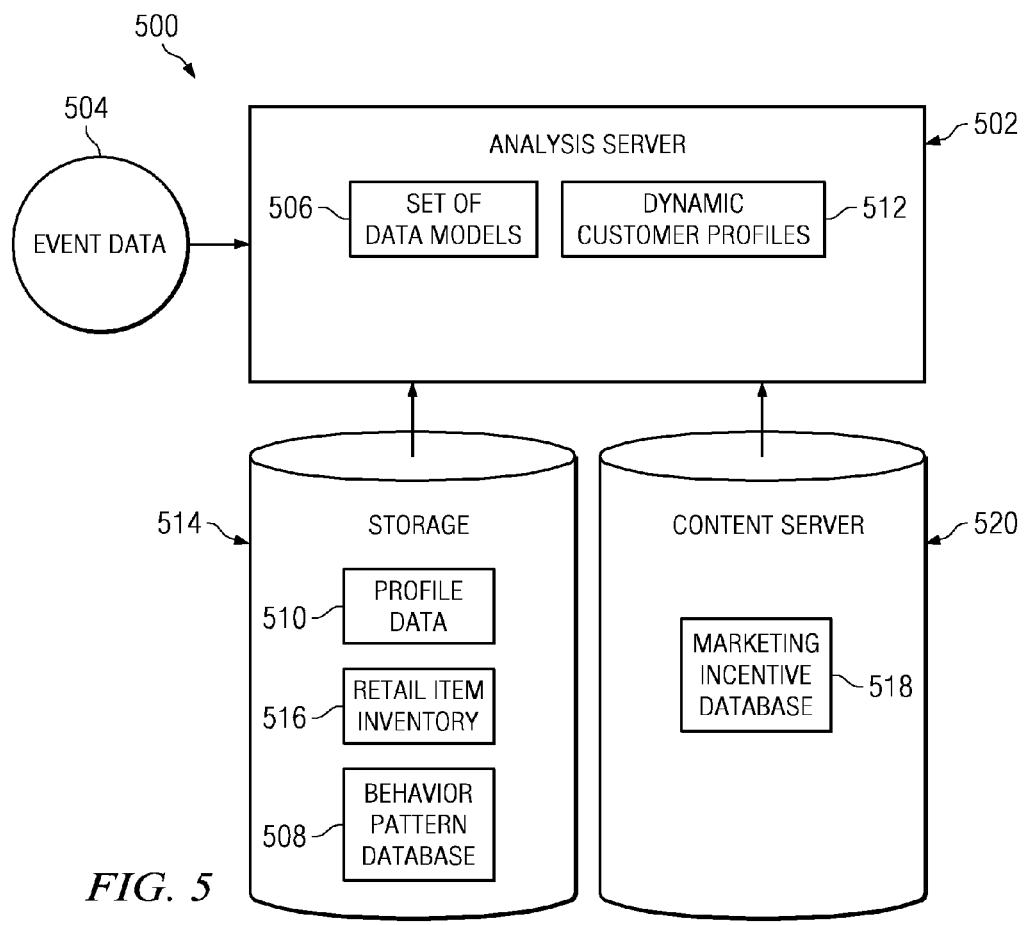
FIG. 5 is a block diagram of a data processing system for analyzing event data to identify customer behavior types for optimizing loss leader merchandizing in accordance with an illustrative embodiment.

An analysis server, such as the analysis server described in FIG. 5, stores a listing of the physical patterns of behavior demonstrated by the customer while at a retail facility. The analysis server in a data processing system associated with retail facility 200 begins analyzing the event data associated with the customer to identify a customer type to which the customer belongs. Customer types may be identified according to any combination of criteria. For example, customers may be assigned to, associated with, or grouped into a particular customer type based upon similarities, such as the types of purchases commonly made, the amount of money typically spent during each trip to the retail facility, or patterns of behavior exhibited by customers of a customer type. For example, patterns of behavior may include the speed at which the customers walk through a retail facility, whether customers reference grocery lists or whether customers speak on a cell phone while shopping.

In addition, customers may be grouped according to a degree of interaction with retail items. A degree of interaction is a qualitative or quantitative amount of interaction by a customer with a retail item. For example, a degree of interaction may relate to how closely a customer reads a nutrition label on a box of cereal, how long a customer may compare two retail items, or the extent to which customers poke and prod fruit before selecting a piece of fruit for purchase.

A degree of interaction may also be determined based upon how long a customer stops at a display shelf to inspect a retail item. For example, customers may not stop and browse meat products of a refrigerator unit because the price may be too high. However, customers may spend increasing amounts of time browsing meat products as prices of the meat decreases. In addition, at some price a majority of customers may actually select a meat product for purchase. In this manner, an analysis server may identify a price of retail items at which customers are more likely to purchase a retail item. Such information may be later used to generate a price-based marketing incentive.

In addition, customers may be grouped based upon financial criteria, such as an amount of money spent, or the amount of profit realized by a retail facility in each trip by a customer. In this embodiment, the analysis server may identify physical patterns of behavior common to customers of each customer type. Thus, if the analysis server recognizes certain physical patterns of behavior exhibited by a type of customer of a retail facility, then the analysis server may be able to categorize customers of a retail facility before the customer is identified at a point of sale, either by a credit card or by a customer loyalty card.

The analysis server may also identify additional associations between customer types and the retail items offered for sale at retail facility 200. For example, in an illustrative example, an analysis server identifies a physical pattern of behavior common to members of a customer type that spends the most money at a retail facility per trip to the retail facility. In particular, the physical pattern of customer behavior is the tendency for this type of customer to walk slowly through the retail facility and look at all the display devices and display shelves. The analysis server may also identify, from a customer profile displaying the customer's purchasing history, that these types of customers commonly purchase beer, steak, charcoal, lighter fluid, paper plates and disposable plastic cups. Using these associations, the analysis server may identify retail items that may be offered as loss leader items in order to promote the sale of complementary items. In this example, if beer, charcoal, lighter fluid, paper plates, and disposable plastic cups are the highest profit retail items, then the analysis server may identify steak as a loss leader item and price it accordingly to entice customers to visit a retail facility to purchase the other items, which are complementary items.

An analysis server may present customers of a customer type with marketing incentives for the purchase of the steak, which is the loss leader in this example. The marketing incentives may be presented to customers on a display device while the customers are located at the retail facility. In addition, the marketing incentive may be presented to the customers after the customers have left the retail facility. In this scenario, the customers may be presented with a marketing incentive in a newspaper advertisement, in an email message, in an advertisement placed on a billboard, or any other manner.

Customers of a selected customer type may be presented with preferential marketing incentives. Preferential marketing incentives are marketing incentives that are specially selected for a selected customer type. Preferential marketing incentives may offer free retail items or heavily discounted retail items not offered to less profitable customer types. In addition, preferential marketing incentives may be marketing incentives sent to lower profitable customer types, but sent to higher profitable customer types with more frequency. Preferential marketing incentives are presented to selected customer types to entice certain customer types to visit a retail facility more frequently.

Selected customer types may be identified according to profitability. In this manner, more profitable customer types may be persuaded to visit a retail facility more often, thereby spending more money and increasing a retail facility's revenue. By withholding preferential marketing incentives from less profitable customer groups, retail facilities may limit losses associated with loss leader merchandizing. For example, less profitable customer types may include customers that stockpile loss leader retail items without purchasing the associated complementary items. Consequently, retail facilities may suffer financial losses. Thus, the illustrative embodiment provides an intelligent marketing scheme to optimize loss leader merchandizing, thereby decreasing losses associated with loss leader merchandizing and increasing revenue.

Turning now to FIG. 4, a diagram of a smart detection system is depicted in accordance with an illustrative embodiment. System 400 is a system, such as network data processing system 100 in FIG. 1. System 400 incorporates multiple independently developed event analysis technologies in a common framework. An event analysis technology is a collection of hardware and/or software usable to capture and analyze event data. For example, an event analysis technology may be the combination of a video camera and facial recognition software. Images of faces captured by the video camera are analyzed by the facial recognition software to identify the subjects of the images.

Smart detection, also known as smart surveillance, is the use of computer vision and pattern recognition technologies to analyze detection data gathered from situated cameras and microphones. The analysis of the detection data generates events of interest in the environment. For example, an event of interest at a departure drop off area in an airport includes "cars that stop in the loading zone for extended periods of time." As smart detection technologies have matured, they have typically been deployed as isolated applications, which provide a particular set of functionalities.

Smart detection system 400 is a smart detection system architecture for analyzing video images captured by a camera and/or audio captured by an audio detection device. Smart detection system 400 includes software for analyzing audio/video data 404. In this example, smart detection system 400 processes audio/video data 404 for an industrial worker into data and metadata to form query and retrieval services 425. Smart detection system 400 may be implemented using any known or available software for performing voice analysis, facial recognition, license plate recognition, and sound analysis. In this example, smart detection system 400 is implemented as IBM® smart surveillance system (S3) software.

An audio/video capture device is any type of known or available device for capturing video images and/or capturing audio. The audio/video capture device may be, but is not limited to, a digital video camera, a microphone, a web camera, or any other device for capturing sound and/or video images. For example, the audio/video capture device may be implemented as sensor 208 in FIG. 2.

Audio/video data 404 is detection data captured by the audio/video capture devices. Audio/video data 404 may be a sound file, a media file, a moving video file, a media file, a still picture, a set of still pictures, or any other form of image data and/or audio data. Audio/video data 404 may also be referred to as detection data. Audio/video data 404 may include images of a person's face, an image of a part or portion of a car, an image of a license plate on a car, and/or one or more images showing a person's behavior. For example, a set of images corresponding to physical behavioral patterns of customers may be captured, processed, and analyzed to identify customer behavior types.

In this example, the architecture of smart detection system 400 is adapted to satisfy two principles.

1) Openness: The system permits integration of both analysis and retrieval software made by third parties. In one embodiment, the system is designed using approved standards and commercial off-the-shelf (COTS) components.

2) Extensibility: The system should have internal structures and interfaces that will permit the functionality of the system to be extended over a period of time.

The architecture enables the use of multiple independently developed event analysis technologies in a common framework. The events from all these technologies are cross indexed into a common repository or multi-mode event database 402 allowing for correlation across multiple audio/video capture devices and event types.

Smart detection system 400 includes the following illustrative technologies integrated into a single system. License plate recognition technology 408 may be deployed at the entrance to a facility where license plate recognition technology 408 catalogs a license plate of each of the arriving and departing vehicles in a parking lot or roadway associated with the facility. For example, license plate recognition technology 408 may be implemented to track movement of customers' vehicles in the parking lot of a retail facility.

Behavior analysis technology 406 detects and tracks moving objects and classifies the objects into a number of predefined categories. As used herein, an object may be a human customer or an object, such as equipment, retail items, shopping carts, display devices, display shelves, or any other object. Behavior analysis technology 406 could be deployed on various cameras overlooking a parking lot, a perimeter, or inside a facility.

Face detection/recognition technology 412 may be deployed at entry ways to capture and recognize faces. Badge reading technology 414 may be employed to read badges. Radar analytics technology 416 may be employed to determine the presence of objects.

Events from access control technologies can also be integrated into smart detection system 400. The data gathered from behavior analysis technology 406, license plate recognition 408, Face detection/recognition technology 412, badge reader technology 414, radar analytics technology 416, and any other video/audio data received from a camera or other video/audio capture device is received by smart detection system 400 for processing into query and retrieval services 425.

The events from all the above surveillance technologies are cross indexed into a single repository, such as multi-mode event database 402. In such a repository, a simple time range query across the modalities will extract license plate information, vehicle appearance information, badge information, and face appearance information, thus permitting an analyst to easily correlate these attributes. The architecture of smart detection system 400 also includes one or more smart surveillance engines (SSEs) 418, which house event detection technologies.

Smart detection system 400 further includes middleware for large scale surveillance (MILS) 420 and 421, which provides infrastructure for indexing, retrieving, and managing event metadata.

In this example, audio/video data 404 is received from a variety of audio/video capture devices, such as sensor 208 in FIG. 2, and processed in smart surveillance engine 418. Each smart surveillance engine 418 is operable to generate real time alerts and generic event metadata. The metadata generated by smart surveillance engine 418 may be represented using extensible markup language (XML). The XML documents include a set of fields which are common to all engines and others which are specific to the particular type of analysis being performed by smart surveillance engine 418. In this example, the metadata generated by smart surveillance engine 418 is transferred to a backend middleware for large scale surveillance 420. This may be accomplished via the use of, e.g., web services data ingest application program interfaces (APIs) provided by middleware for large scale surveillance 420. The XML metadata is received by middleware for large scale surveillance 420 and indexed into predefined tables in multi-mode event database 402. This may be accomplished using, for example, and without limitation, the DB2™ XML extender, if an IBM® DB2™ database is employed. This permits for fast searching using primary keys. Middleware for large scale surveillance 421 provides a number of query and retrieval services 425 based on the types of metadata available in the database. Query and retrieval services 425 may include, for example, event browsing, event search, real time event alert, or pattern discovery event interpretation. Each event has a reference to the original media resource, such as, without limitation, a link to the video file. This allows a user to view the video associated with a retrieved event.

Smart detection system 400 provides an open and extensible architecture for smart video surveillance. Smart surveillance engine 418 preferably provides a plug and play framework for video analytics. The event metadata generated by smart surveillance engine 418 may be sent to multi-mode event database 402 as XML files. Web services API's in middleware for large scale surveillance 420 permit for easy integration and extensibility of the metadata. Query and retrieval services 425, such as, for example, event browsing and real time alerts, may use structure query language (SQL) or similar query language through web services interfaces to access the event metadata from multi-mode event database 402.

The smart surveillance engine (SSE) 418 may be implemented as a C++ based framework for performing real time event analysis. Smart surveillance engine 418 is capable of supporting a variety of video/image analysis technologies and other types of sensor analysis technologies. Smart surveillance engine 418 provides at least the following support functionalities for the core analysis components. The support functionalities are provided to programmers or users through a plurality of interfaces employed by smart surveillance engine 418. These interfaces are illustratively described below.

Standard plug-in interfaces are provided. Any event analysis component, which complies with the interfaces defined by smart surveillance engine 418 can be plugged into smart surveillance engine 418. The definitions include standard ways of passing data into the analysis components and standard ways of getting the results from the analysis components. Extensible metadata interfaces are provided. Smart surveillance engine 418 provides metadata extensibility. For example, consider a behavior analysis application which uses detection and tracking technology. Assume that the default metadata generated by this component is object trajectory and size. If the designer now wishes to add color of the object into the metadata, smart surveillance engine 418 enables this by providing a way to extend the creation of the appropriate XML structures for transmission to the backend (MILS) system 420.

Real time alerts are highly application-dependent. For example, while a person loitering may require an alert in one application, the absence of a guard at a specified location may require an alert in a different application. Smart surveillance engine 418 provides an easy real time alert interfaces mechanism for developers to plug-in for application specific alerts. Smart surveillance engine 418 provides standard ways of accessing event metadata in memory and standardized ways of generating and transmitting alerts to the backend (MILS) system 420.

In many applications, users will need the use of multiple basic real time alerts in a spatio-temporal sequence to compose an event that is relevant in the user's application context. Smart surveillance engine 418 provides a simple mechanism for composing compound alerts via compound alert interfaces. In many applications, the real time event metadata and alerts are used to actuate alarms, visualize positions of objects on an integrated display, and control cameras to get better surveillance data. Smart surveillance engine 418 provides developers with an easy way to plug-in actuation modules, which can be driven from both the basic event metadata and by user defined alerts using real time actuation interfaces.

Using database communication interfaces, smart surveillance engine 418 also hides the complexity of transmitting information from the analysis engines to the multi-mode event database 402 by providing simple calls to initiate the transfer of information.

The IBM middleware for large scale surveillance (MILS) 420 and 421 may include a J2EE™ frame work built around IBM's DB2™ and IBM WebSphere™ application server platforms. Middleware for large scale surveillance 420 supports the indexing and retrieval of spatio-temporal event metadata. Middleware for large scale surveillance 420 also provides analysis engines with the following support functionalities via standard web service interfaces using XML documents.

Middleware for large scale surveillance 420 and 421 provide metadata ingestion services. These are web service calls, which allow an engine to ingest events into middleware for large scale surveillance 420 and 421 system. There are two categories of ingestion services. 1) Index Ingestion Services: This permits for the ingestion of metadata that is searchable through SQL like queries. The metadata ingested through this service is indexed into tables, which permit content based searches, such as provided by middleware for large scale surveillance 420. 2) Event Ingestion Services: This permits for the ingestion of events detected in smart surveillance engine 418, such as provided by middleware for large scale surveillance 421. For example, a loitering alert that is detected can be transmitted to the backend along with several parameters of the alert. These events can also be retrieved by the user but only by the limited set of attributes provided by the event parameters.

Middleware for large scale surveillance 420 and/or 421 provides schema management services. Schema management services are web services which permit a developer to manage their own metadata schema. A developer can create a new schema or extend the base middleware for large scale surveillance schema to accommodate the metadata produced by their analytical engine. In addition, system management services are provided by middleware for large scale surveillance 420 and/or 421.

The schema management services of middleware for large scale surveillance 420 and 421 provide the ability to add a new type of analytics to enhance situation awareness through cross correlation. For example, a new type of detection device may be developed in the future. Thus, it is important to permit smart detection system 400 to add new types of analytics and cross correlate the existing analytics with the new analytics. To add/register a new type of sensor and/or analytics to increase situation awareness, a developer can develop new analytics and plug them into smart surveillance engine 418, and employ middleware for large scale surveillance schema management service to register new intelligent tags generated by the new smart surveillance engine analytics. After the registration process, the data generated by the new analytics is immediately available for cross correlating with existing index data.

System management services provide a number of facilities needed to manage smart detection system 400 including: 1) Camera Management Services: These services include the functions of adding or deleting a camera from a middleware for large scale surveillance system, adding or deleting a map from a middleware for large scale surveillance system, associating a camera with a specific location on a map, adding or deleting views associated with a camera, assigning a camera to a specific middleware for large scale surveillance server and a variety of other functionalities needed to manage the system. 2) Engine Management Services: These services include functions for starting and stopping an engine associated with a camera, configuring an engine associated with a camera, setting alerts on an engine and other associated functionalities. 3) User Management Services: These services include adding and deleting users to a system, associating selected cameras to a viewer, associating selected search and event viewing capacities with a user and associating video viewing privileges with a user. 4) Content Based Search Services: These services permit a user to search through an event archive using a plurality of types of queries.

For the content based search services (4), the types of queries may include: A) Search by Time retrieves all events from query and retrieval services 425 that occurred during a specified time interval. B) Search by Object Presence retrieves the last one hundred events from a live system. C) Search by Object Size retrieves events where the maximum object size matches the specified range. D) Search by Object Type retrieves all objects of a specified type. E) Search by Object Speed retrieves all objects moving within a specified velocity range. F) Search by Object Color retrieves all objects within a specified color range. G) Search by Object Location retrieves all objects within a specified bounding box in a camera view. H) Search by Activity Duration retrieves all events from query and retrieval services 425 with durations within the specified range. I) Composite Search combines one or more of the above capabilities. Other system management services may also be employed.

Referring now to FIG. 5, a block diagram of a data processing system for analyzing event data to identify physical patterns of customer behavior for identifying customer types is depicted in accordance with an illustrative embodiment. Data processing system 500 is a data processing system, such as data processing system 100 in FIG. 1 and data processing system 300 in FIG. 3.

Analysis server 502 is any type of known or available server for analyzing detection data and/or event data for use in identifying physical patterns of customer behavior for use in optimizing loss leader merchandizing. Analysis server 502 may be a server, such as server 104 in FIG. 1 or data processing system 300 in FIG. 3.

Analysis server 502 is configured to process and analyze event data 504 to identify physical patterns of behavior of customers in a retail facility. Event data 504 is data or metadata describing events occurring in the retail marketing environment, including physical patterns of customer behavior. Processing event data 504 may include, but is not limited to, filtering event data 504 for relevant data elements, combining event data 504 with profile data 510, comparing event data 504 to baseline or comparison models for external data, and/or formatting event data 504 for utilization and/or analysis in one or more data models in set of data models 506 to form the dynamic data.

Set of data models 506 is one or more data models created a priori or pre-generated. Set of data models 506 includes one or more data models for parsing event data, identifying physical patterns of customer behavior, and identifying types of customers. Set of data models 506 may be generated using statistical, data mining, simulation and/or modeling techniques. In this example, set of data models 506 includes, but is not limited to, a unifying data model, system data models, event data models, and/or user data models. These data models are discussed in greater detail in FIG. 6 below.

The physical patterns of customer behavior are stored in behavior pattern database 508. Behavior pattern database 508 may be any form of structured collection of records or data. The databases may be, for example, a spreadsheet, a table, a relational database, a hierarchical database, or the like. A database also may be an application that manages access to a collection of data.

Profile data 510 is data about one or more customers that may be retrieved from a file, database, data warehouse, or any other data storage device. Profile data may include a global profile, individual profile, and demographic profile. The profiles may be combined or layered to define the customer for selecting marketing incentives. In the illustrative embodiments, profile data 510 includes data on the customers' interests, preferences, and affiliation. Profile data 510 may also include information relating to point of sale data. Various firms provide data for purchase, which is grouped or keyed to presenting a lifestyle or life stage view of customers by block or group or some other baseline parameter. The purchased data presents a view of the customer based on aggregation of data points such as, but not limited to geographic block, age of head of household, income level, number of children, education level, ethnicity, and buying patterns.

Profile data 510 may also include granular demographics. Granular demographics include data associated with a detailed demographic profile for one or more customers. Granular demographics may include, without limitation, ethnicity, block group, lifestyle, life stage, income, and education data.

Profile data 510 may also include psychographic data. Psychographic data refers to an attitude profile of the customer. Examples of attitude profiles include a trend buyer or a time-strapped person who prefers to purchase a complete outfit, or a professional buyer who prefers to mix and match individual items from various suppliers.

Profile data 510 may be associated or combined with data stored in behavior pattern database 508 to form dynamic customer profiles 512. Dynamic customer profiles 512 are customer profiles incorporating data describing a type of customer. Analysis server 502 may analyze dynamic customer profiles 512 for identifying loss leader items and complementary items to offer specific customer types.

In this example, profile data 510 and behavior pattern database 508 are stored in storage device 514. Storage device 514 is a storage device such as storage 108 in FIG. 1, or any other local or remote data storage device. In addition, storage device 514 includes retail item inventory 516. Retail item inventory 516 is a database storing lists of retail items located in a retail facility, such as retail facility 200 in FIG. 2. Analysis server 502 may identify loss leader items and complementary items from the retail items stored in retail item inventory 516.

Once analysis server 502 has identified loss leader items and complementary items from dynamic customer profiles 512, analysis server 502 selects an appropriate marketing incentive to present to customers of a selected customer type. The marketing incentives promote the sale of loss leader items.

Analysis server 502 may provide customers of a particular customer type with marketing incentives stored in marketing incentive database 518. Marketing incentive database 518 is a database that may include policies specifying the retail items, which may be discounted and the extent to which a retail item may be discounted. In addition, marketing incentive database 518 may include policies specifying the type of marketing incentive that may be provided to customers of a retail facility and how the marketing incentive is to be presented to customers. Marketing incentive database is stored in content server 520. Content server 520 is a server such as server 104 in FIG. 1.

Figure 6:
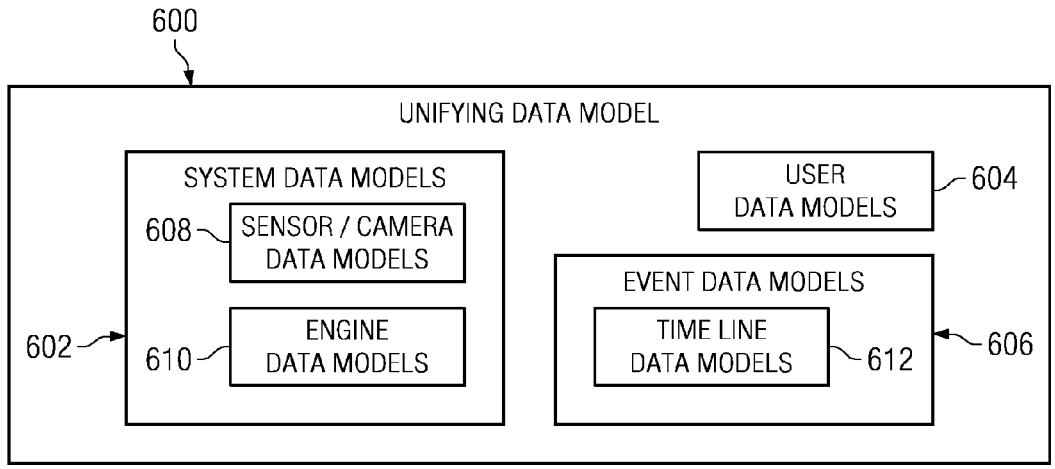
FIG. 6 is a block diagram of a unifying data model for processing event data in accordance with an illustrative embodiment.

Turning now to FIG. 6, a block diagram of a unifying data model for processing event data is depicted, in accordance with an illustrative embodiment. The event data generated by a smart detection system may be processed by one or more data models in a set of data models, such as set of data models 508 in FIG. 5, to identify physical patterns of customer behavior from detection data and/or event data. Unifying data model 600 is an example of a data model for processing event data.

In this example, unifying data model 600 has three types of data models, namely; 1) system data models 602, which captures the specification of a given monitoring system, including details like geographic location of the system, number of cameras deployed in the system, physical layout of the monitored space, and other details regarding the facility; 2) user data models 604 models users, privileges, and user functionality; and 3) event data models 606, which captures the events that occur in a specific sensor or zone in the monitored space. Each of these data models is described below.

System data models 602 has a number of components. These may include sensor/camera data models 608. The most fundamental component of this sensor/camera data models 608 is a view. A view is defined as some particular placement and configuration, such as a location, orientation, and/or parameters, of a sensor. In the case of a camera, a view would include the values of the pan, tilt, and zoom parameters, any lens and camera settings, and position of the camera. A fixed camera can have multiple views. The view "Id" may be used as a primary key to distinguish between events being generated by different sensors. A single sensor can have multiple views. Sensors in the same geographical vicinity are grouped into clusters, which are further grouped under a root cluster. There is one root cluster per middleware for large scale surveillance server.

Engine data models 610 provides a comprehensive security solution, which utilizes a wide range of event detection technologies. Engine data models 610 captures at least some of the following information about the analytical engines: Engine Identifier: A unique identifier assigned to each engine; Engine Type: This denotes the type of analytic being performed by the engine, for example, face detection, behavior analysis, and/or LPR; and Engine Configuration: This captures the configuration parameters for a particular engine.

User data models 604 captures the privileges of a given user. These may include selective access to camera views; selective access to camera/engine configuration and system management functionality; and selective access to search and query functions.

Event data models 606 represents the events that occur within a space that may be monitored by one or more cameras or other sensors. Event data models may incorporate time line data models 612 for associating the events with a time. By associating the events with a time, an integrated event may be defined. An integrated event is an event that may include multiple sub-events. Time line data models 612 uses time as a primary synchronization mechanism for events that occur in the real world, which is monitored through sensors. The basic middleware for large scale surveillance schema allows multiple layers of annotations for a given time span.

Figure 7:
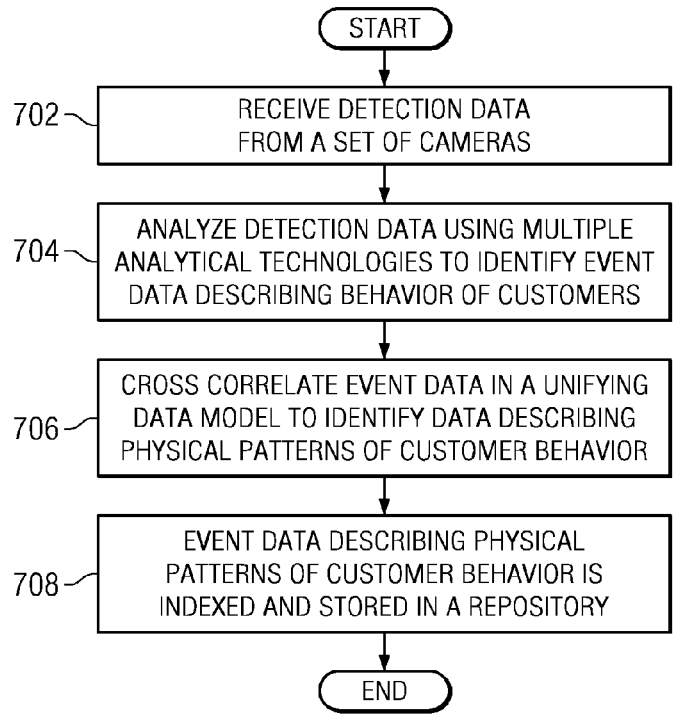
FIG. 7 is a flowchart illustrating a smart detection system generating event data in accordance with an illustrative embodiment.

Turning now to FIG. 7, a process for generating event data by a smart detection system is depicted in accordance with an illustrative embodiment. The process in FIG. 7 may be implemented by a smart detection system, such as smart detection system 400 in FIG. 4.

The process begins by receiving detection data from a set of cameras (step 702). The process analyzes the detection data using multiple analytical technologies to identify event data describing behavior of customers (step 704). The multiple technologies may include, for example, a behavior analysis engine, a license plate recognition engine, a face recognition engine, a badge reader engine, and/or a radar analytic engine.

Event data is cross correlated in a unifying data model to identify data describing physical patterns of customer behavior (step 706). Cross correlating provides integrated situation awareness across the multiple analytical technologies. The cross correlating may include correlating events to a time line to associate events to define an integrated event. The event data describing physical patterns of customer behavior is indexed and stored in a repository, such as a database (step 708) with the process terminating thereafter.

In the example in FIG. 7, the database can be queried to determine an integrated event that matches the query. This includes employing cross correlated information from a plurality of information technologies and/or sources. New analytical technologies may also be registered. The new analytical technologies can employ models and cross correlate with existing analytical technologies to provide a dynamically configurable surveillance system.

In this example, detection data is received from a set of cameras. However, in other embodiments, detection data may come from other detection devices, such as, without limitation, a badge reader, a microphone, a motion detector, a heat sensor, or a radar.

Figure 8:
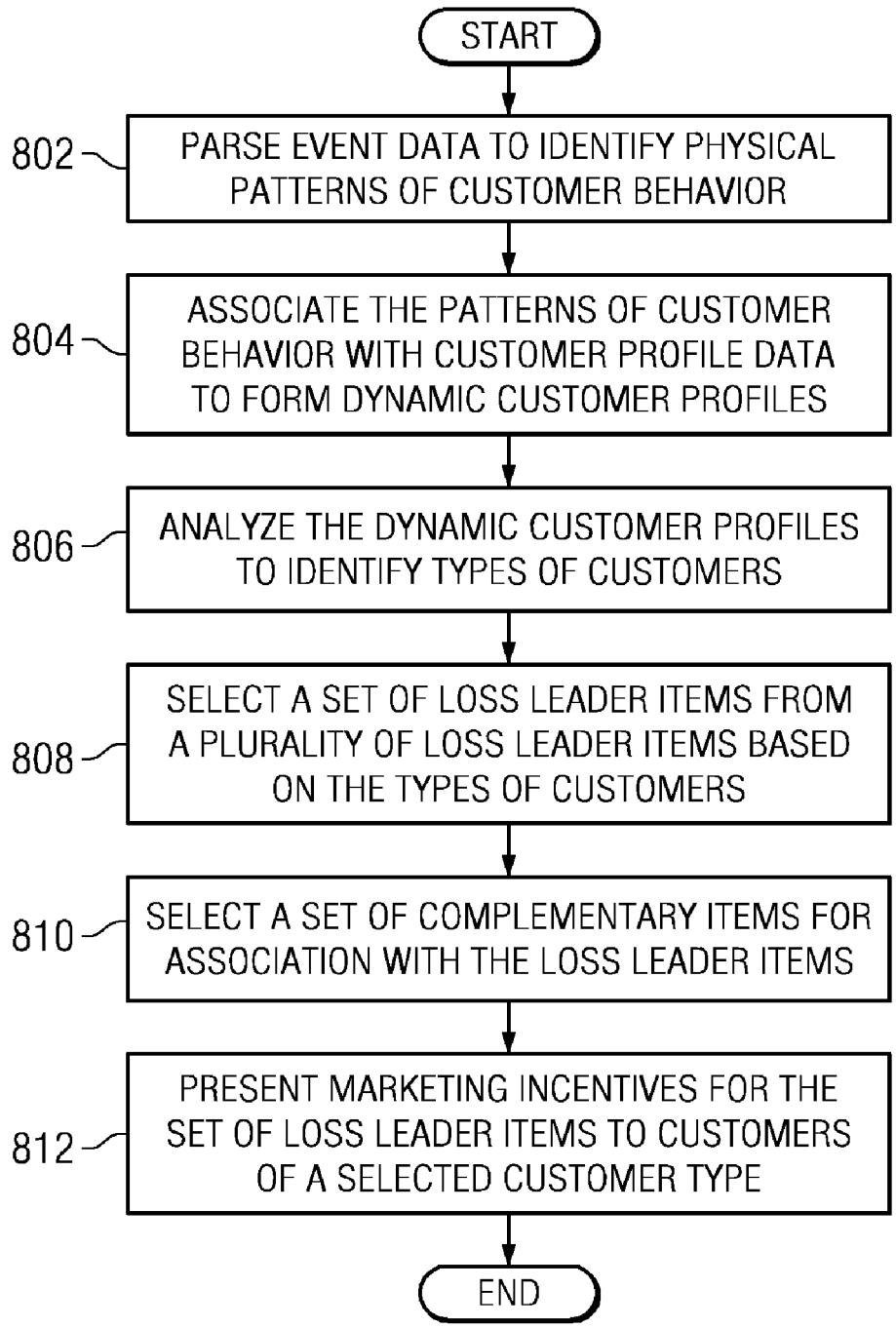
FIG. 8 is a flowchart illustrating a process for identifying customer behavioral types to optimize loss leader merchandizing in accordance with an illustrative embodiment.

FIG. 8 is a flowchart of a process for optimizing loss leader merchandizing in accordance with an illustrative embodiment. The process in FIG. 8 may be implemented by an analysis server, such as analysis server 502 in FIG. 5.

The process begins by parsing event data to identify physical patterns of customer behavior (step 802). The process then associates the patterns of customer behavior with customer profile data to form dynamic customer profiles (step 804).

Thereafter, the process analyzes the dynamic customer profiles to identify types of customers (step 806). The process then selects a set of loss leader items from a plurality of loss leader items based on the types of customers (step 808). The process may also select a set of complementary items for association with the loss leader items (step 810). The selection may be made according to purchasing trends evident from an analysis of dynamic customer profiles, such as dynamic customer profiles 512 in FIG. 5. The process then presents marketing incentives for the set of loss leader items to customers of a selected type of customer (step 812) and the process terminates thereafter.

The flowcharts and block diagrams in the different depicted embodiments illustrate the architecture, functionality, and operation of some possible implementations of apparatus, methods and computer usable program products. In this regard, each step in the flowcharts or block diagrams may represent a module, segment, or portion of code, which comprises one or more executable instructions for implementing the specified function or functions. In some alternative implementations, the function or functions noted in the step may occur out of the order noted in the figures. For example, in some cases, two steps shown in succession may be executed substantially concurrently, or the blocks may sometimes be executed in the reverse order, depending upon the functionality involved.

The illustrative embodiments provide a computer implemented method, apparatus, and computer usable program product optimizing loss leader merchandizing. The process parses event data to identify physical patterns of customer behavior, wherein the event data is derived from a continuous video stream captured at a retail facility, and associates the patterns of customer behavior with customer profile data to form dynamic customer profiles. The process then analyzes the dynamic customer profiles to identify types of customers and presents marketing incentives for a set of loss leader items to customers of a selected customer type, wherein the set of loss leader items are selected based on the dynamic profiles.

The illustrative embodiments permit retail facilities to optimize loss leader merchandizing by facilitating the identification of customer types based upon physical patterns of customer behavior. Once customer types are identified, then associations between customer types and purchasing tendencies may be identified. Using this information, an analysis server may identify loss leader items for attracting customers to a retail facility. In addition, the analysis server may select marketing incentives to present to customers of that customer type. Furthermore, the analysis server may select one or more complementary items for association with the loss leader items. In this manner, a retail facility may increase revenue by selling selected complementary items associated with loss leader items.

The illustrative embodiments facilitate the identification of customer types of customers who may pay with cash or do not possess customer loyalty cards. These customers lack identifying information that may be used to generate profile data. However, using the smart detection system provided herein, these customers may still be identified and useful data may be derived based upon the physical patterns of behavior captured by sensors deployed throughout a retail facility.

In addition, the illustrative embodiments enable a retail facility to collect more information about the manner in which customers interact with retail items. The collected information may allow a retail facility to optimize loss leader merchandizing based upon, for example, the customers' reaction to existing marketing incentives.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for optimizing loss leader merchandizing, the computer implemented method comprising:
    parsing, using one or more processors, first event data to identify first physical patterns of customer behavior, wherein the first event data is derived from a continuous video stream captured at a retail facility;
    determining, through cross correlation, gaps in situation awareness, requiring installation of a new sensor different than the continuous video stream to increase situation awareness;
    installing said new sensor different than the continuous video stream;
    parsing, using one or more processors, second event data to identify second physical patterns of customer behavior, wherein the second event data is based on information taken by the new sensor;
    cross correlating, using the one or more processors, the first event data and the second event data to form second physical patterns of customer behavior different than the first physical patterns of behavior;
    associating, using the one or more processors, the second physical patterns of customer behavior with customer profile data to form dynamic customer profiles;
    analyzing, using the one or more processors, the dynamic customer profiles to identify types of customers; and
    presenting, on a display that receives data from the one or more processors, to customers of a selected customer type, marketing incentives for a set of loss leader items, wherein the set of loss leader items are selected based on the dynamic profiles, and wherein the set of loss leader items comprise retail items that are given away or sold at or below cost.

2. The computer implemented method of claim 1, further comprising:
    identifying, from the dynamic customer profiles, a set of complementary items for association with the set of loss leader items.

3. The computer implemented method of claim 1, wherein the set of loss leader items is at least one retail item selected to promote sale of a set of complementary items.

4. The computer implemented method of claim 1, wherein the patterns of customer behavior comprise a degree of interaction with at least one of the set of loss leader items and a set of complementary items.

5. The computer implemented method of claim 1, wherein the selected customer type is identified based on profitability.

6. The computer implemented method of claim 5, wherein customers of the selected customer type are provided with preferential marketing incentives.

7. The computer implemented method of claim 1, further comprising:
    receiving video data from a set of sensors associated with the retail facility; and
    analyzing the video data to identify the first event data, wherein analyzing the video data comprises generating metadata describing the first physical patterns of customer behavior.

8. The computer implemented method of claim 7, wherein the set of sensors comprises a set of digital video cameras.

9. The computer implemented method of claim 1, wherein parsing the first event data further comprises:
    processing the first event data using at least one of a statistical method, a data mining method, a causal model, a mathematical model, a marketing model, a behavioral model, a psychological model, a sociological model, or a simulation model.

10. A computer program product comprising:
    a computer usable medium including computer usable program code for optimizing loss leader merchandizing, the computer program product comprising:
    computer usable program code for parsing event data to identify physical patterns of customer behavior, wherein the event data is derived from a continuous video stream captured at a retail facility;
    computer usable program code for determining, through cross correlation, gaps in situation awareness, requiring installation of a new sensor different than the continuous video stream to increase situation awareness;
    computer usable program code for installing said new sensor different than the continuous video stream;
    computer usable program code for associating the physical patterns of customer behavior with customer profile data to form dynamic customer profiles;
    computer usable program code for analyzing the dynamic customer profiles to identify types of customers; and
    computer usable program code for presenting, to customers of a selected customer type, marketing incentives for a set of loss leader items, wherein the set of loss leader items are selected based on the dynamic profiles, and wherein the set of loss leader items comprise retail items that are given away or sold at or below cost.

11. The computer program product of claim 10, further comprising:
    computer usable program code for identifying, from the dynamic customer profiles, a set of complementary items for association with the set of loss leader items.

12. The computer program product of claim 10, wherein the set of loss leader items is at least one retail item selected to promote sale of a set of complementary items.

13. The computer program product of claim 10, wherein the patterns of customer behavior comprise a degree of interaction with at least one of the set of loss leader items and a set of complementary items.

14. The computer program product of claim 10, wherein the selected customer type is identified based on profitability.

15. The computer program product of claim 14, wherein customers of the selected customer type are provided with preferential marketing incentives.

16. The computer program product of claim 10, further comprising:

computer usable program code for receiving video data from a set of sensors associated with the retail facility; and computer usable program code for analyzing the video data to identify the event data, wherein analyzing the video data comprises generating metadata describing the physical patterns of customer behavior.

17. The computer program product of claim 16, wherein the set of sensors comprises a set of digital video cameras.

18. The computer program product of claim 10, wherein the computer usable program code for parsing the event data further comprises:

computer usable program code for processing the event data using at least one of a statistical method, a data mining method, a causal model, a mathematical model, a marketing model, a behavioral model, a psychological model, a sociological model, or a simulation model.

19. A system for optimizing loss leader merchandizing, the system comprising:

a database, wherein the database stores event data collected by a set of sensors; and an analysis server, wherein the analysis server parses the event data to identify physical patterns of customer behavior, wherein the event data is derived from a continuous video stream captured at a retail facility;

determine, through cross correlation, gaps in situation awareness, requiring installation of a new sensor different than the continuous video stream to increase situation awareness;

install said new sensor different than the continuous video stream;

associates the physical patterns of customer behavior with customer profile data to form dynamic customer profiles;

analyzes the dynamic customer profiles to identify types of customers; and presents, to customers of a selected customer type, marketing incentives for a set of loss leader items, wherein the set of loss leader items are selected based on the dynamic profiles, and wherein the set of loss leader items comprise retail items that are given away or sold at or below cost.

20. The system of claim 19, wherein the set of sensors comprises a set of digital video cameras.

* * * * *